J. W. NEWTON.
Bog Cutter.

No. 83,784.

Patented Nov. 3, 1868.

Witnesses
Geo H Rothwell
Phil F Larner

Inventor
Jno W Newton
By Diederheim
attys

JOHN W. NEWTON, OF GENEVA, WISCONSIN.

Letters Patent No. 83,784, dated November 3, 1868.

IMPROVEMENT IN BOG-CUTTER AND DRAG.

The Schedule referred to in these Letters Patent and making part of the same.

*To all whom it may concern:*

Be it known that I, JOHN W. NEWTON, of Geneva, in the county of Walworth, and State of Wisconsin, have invented a new and useful Improved Combined Bog-Cutter and Drag; and I do hereby declare the following to be a full, clear, and exact description thereof, sufficient to enable those skilled in the art to which my invention appertains, to fully understand the same, reference being had to the accompanying drawing, forming part of this specification, and in which—

Figure 1:
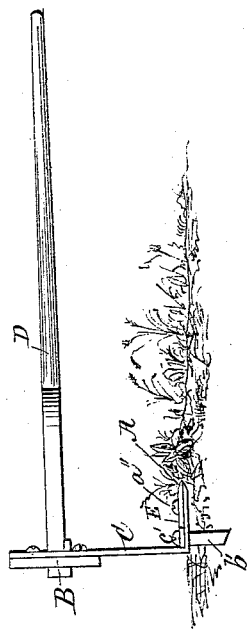

Figure 1 is a perspective view, and

Figure 2:
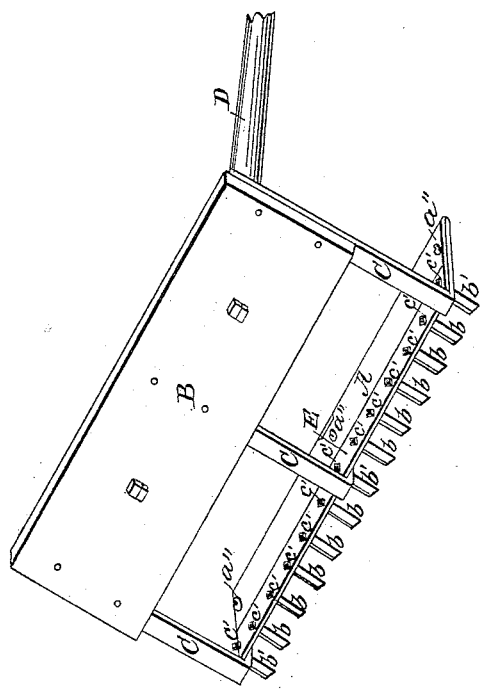

Figure 2, a side view of my improved implement.

The surface of fields, in many cases, is made uneven by small grassy hummocks, which, if they be not removed, render effective plowing very difficult, if not impossible.

The object of my invention is to produce a simple and effective implement for removing these inequalities from the surface of the ground, and dragging the loose sod out of the way.

To this end my invention consists—

First, in attaching to a suitable frame a cutting-blade, which rests upon the ground, and shears or shaves off the inequalities, leaving an unbroken, even surface.

Secondly, my invention consists in the use of teeth, removably attached in the rear of the cutter, and projecting downward. These teeth are attached, after the cutter has passed over the ground, removing its inequalities, and they are used to drag the detached hummocks, sod, and other loose bodies to one side, or out of the way of the plow, as will be hereinafter more fully described.

In order to enable others to fully understand my invention, so as to make and use my improved implement, I will now proceed to describe the same in detail, referring to the drawing, in which similar letters indicate like parts in the several figures.

A, in the drawing, represents the cutter, removably attached to L-shaped straps or hangers C, by bolts and nuts $a''$. These straps or hangers are secured to a stock, B. The front edge of the cutter A is bevelled. D represents the tongue, suitably fixed in the stock B.

In the rear of the cutter is a plate, E, in which are fixed the drag-teeth $b$. These teeth are fitted through holes formed in the plate E, and there secured by nuts $c'$, screwed on to their upper ends. The plate E is attached to the hangers by the teeth $b'$, which pass through the hangers, as well as the plate.

The operation is as follows:

When levelling the ground, the entire plate E may be removed, by simply taking out the teeth $b'$. This should be done especially when operating in hard ground. If the ground be soft or marshy, all or a portion of the teeth may be allowed to remain. They sink into the ground, and thus render the cutter steady in its operation.

The field having been traversed with the cutter, and the knolls or hummocks sheared off, it is dragged, to remove the detached sod to one side or out of the way in plowing. In the operation of dragging, all the teeth are used. The cutter may or may not be detached, as desired. It is preferable, however, to remove the cutter, and fix in its place the plate E, with its teeth. In dragging, the teeth penetrate the earth only to a slight extent.

In fields having an even surface, and with certain conditions of the soil, it is only necessary to use the drag, the cutter not being requisite.

Open spaces are left between the stock B and plate I, so that the sods, detached by the cutter, will pass over the latter, as the machine advances, and be delivered in the rear. Otherwise, they would accumulate on top of the cutter, and impede the proper action of the same, until it became necessary to stop and remove the obstruction.

If desired, pins may be fixed in the stock B, so as to project backward and serve as handles.

My drag is especially useful for dragging meadow-land, which, having been stocked for a long time, has become "turf-bound," and yields but a small product of fine grass. By dragging such land, and cutting it up slightly, the grass grows coarser and higher, and "heads out," and the yield is thereby greatly increased.

Constructed as above described, my combined bog-cutter and drag constitutes a cheap, durable, and effective implement, whereby the preparation of ground for plowing is greatly facilitated.

What I claim as new, and of my invention, and desire to secure by Letters Patent, is—

1. The cutting-blade A, removably secured to the L-shaped straps C, attached to the stock B, and adapted for use either with or without the drag-teeth, substantially as and for the purpose herein set forth.

2. The plate E, provided with removable teeth, and detachably secured to the hangers depending from stock B, when used either with or without the cutter A, for which it can be substituted, substantially as herein described, for the purposes specified.

3. The L-shaped hangers C, secured to the stock B, and adapted for the attachment of the toothed bar E and cutter A, either separately or combined, substantially as described.

4. The combined bog-cutter and drag, consisting of the cutter A, toothed bar I, hangers C, and a stock, all operating substantially as herein described.

To the above, I have signed my name, this 15th day of October, 1868.

JOHN W. NEWTON.

Witnesses:
JOHN A. WIEDERSHEIM,
GEO. W. ROTHWELL.